Oct. 15, 1957     W. H. DANIELS     2,809,862
CONTROL MEANS FOR OPERATION OF A ROOF-CLOSURE
IN RESPONSE TO MOVEMENTS OF THE DOOR AND SEAT
Filed Jan. 18, 1956     3 Sheets-Sheet 1

INVENTOR
William H. Daniels
BY
Paul Fitzpatrick
ATTORNEY

Oct. 15, 1957 W. H. DANIELS 2,809,862
CONTROL MEANS FOR OPERATION OF A ROOF-CLOSURE
IN RESPONSE TO MOVEMENTS OF THE DOOR AND SEAT
Filed Jan. 18, 1956 3 Sheets-Sheet 2

INVENTOR
William H. Daniels
BY Paul Fitzpatrick
ATTORNEY

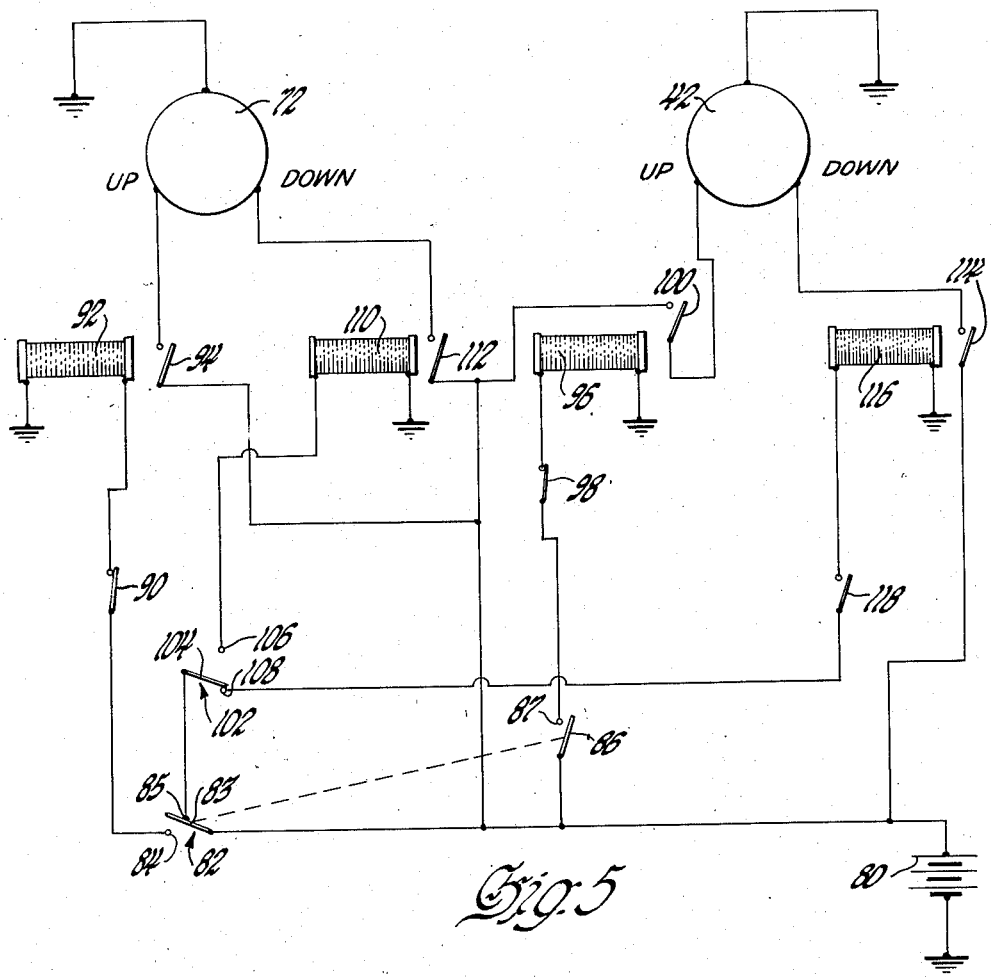

United States Patent Office 2,809,862
Patented Oct. 15, 1957

2,809,862

CONTROL MEANS FOR OPERATION OF A ROOF-CLOSURE IN RESPONSE TO MOVEMENTS OF THE DOOR AND SEAT

William H. Daniels, Oak Park, Mich., assignor to General Motors Corporation, Detroit, Mich., a corporation of Delaware Application January 18, 1956, Serial No. 559,868

6 Claims. (Cl. 296—44)

This invention relates to control means for a vehicle seat and closure, and more particularly to a control circuit for moving a vehicle seat and a roof closure in response to opening and closing movements of the vehicle door to facilitate ingress to and egress from the vehicle.

One feature of the invention is that it provides improved control means for a vehicle seat and closure member; another feature of the invention is that it provides a novel circuit for controlling movement of a vehicle seat and a roof closure in the vehicle in response to opening and closing movements of the vehicle door; a further feature of the invention is that movements of the seat and the roof closure are controlled in predetermined sequence to facilitate access to the vehicle interior; still another feature of the invention is that the vehicle seat is raised and the roof closure is opened in response to opening movement of the vehicle side door; and yet a further feature of the invention is that the seat is lowered in response to closing movement of the door, and subsequently, the roof closure is closed in response to the lowering of the seat.

Other features and advantages of the invention will be apparent from the following description and from the drawings, in which:

Fig. 5 is a schematic circuit diagram of the control means.

In many sport type automobiles the roof is so low that it is difficult for an adult to enter and leave the car. In the automobile illustrated in Figs. 1 and 2, ingress to and egress from the car is facilitated by a roof closure hingedly mounted in the roof adjacent each conventional side door and by a seat which is vertically movable. The improved control means which form the subject of this application are so arranged that when the side door is opened the seat is raised, and simultaneously the roof closure is opened. After the passenger enters the car, the seat is lowered in response to closing movement of the side door, and subsequently, the roof closure is closed in response to the lowering of the seat. When it is desired to leave the car, opening the side door raises the seat and simultaneously opens the roof closure. In the automobile illustrated, there are two roof closures, one at each side adjacent the respective side doors. The seat may be a single seat extending across the passenger compartment, or, preferably, two individual or bucket type seats may be used.

Figure 1:
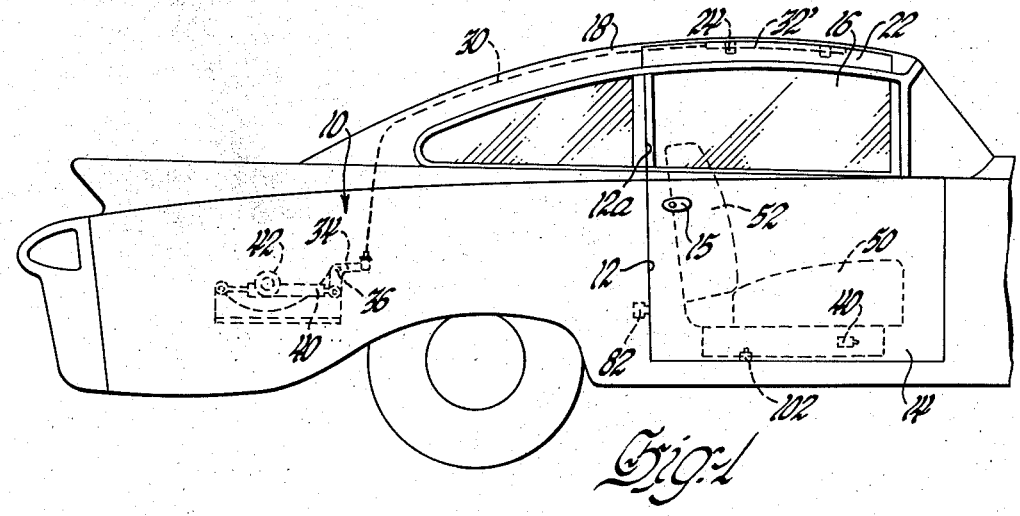
Fig. 1 is a fragmentary side elevation of an automobile incorporating the invention, underlying structure being shown in broken lines.
Figure 2:
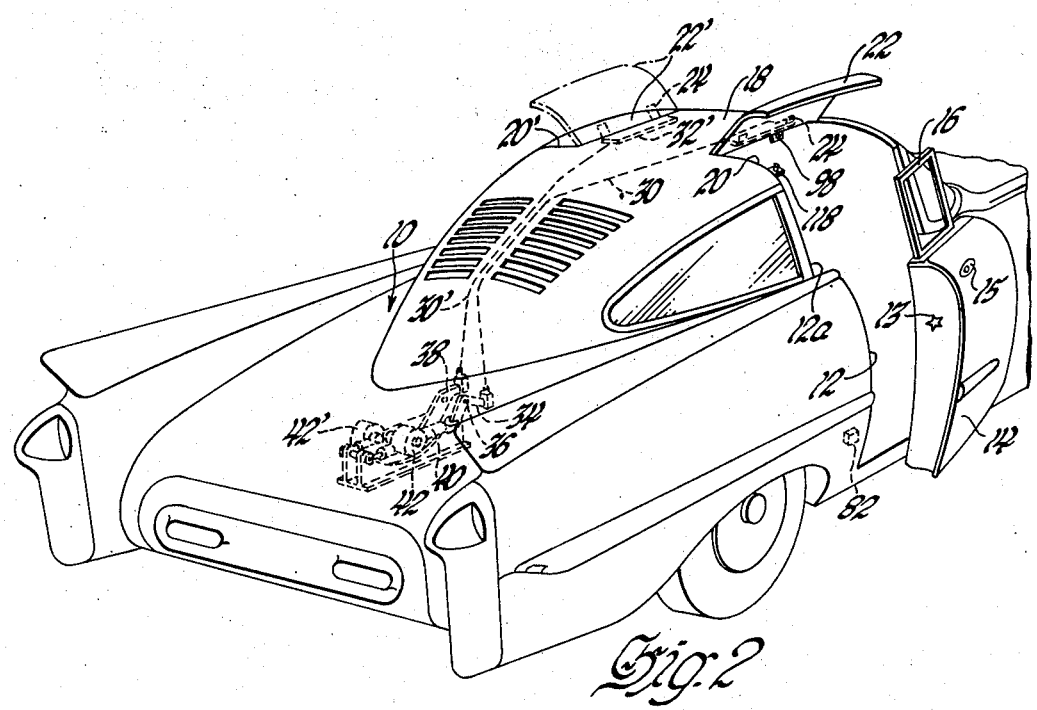
Fig. 2 is a rear perspective view of the automobile of Fig. 1 with the side door and the roof closure open.

Referring now more particularly to the drawings, Figs. 1 and 2 show an automobile having a body designated generally as 10 and having at each side a conventional side door opening 12. Only the opening on the right side of the body is illustrated inasmuch as both sides of the automobile are similar. In the drawings, parts on the left side of the body which are similar to parts on the right side are designated by similar reference characters with a prime (') appended thereto. A door 14 is hingedly mounted on the body in the opening 12, the door having a retractable window 16 which, when in the closed position illustrated, completely closes the upper part 12a of the door opening 12. The door 14 is hingedly mounted at its front edge on the automobile body and the door may be latched in closed position by any conventional and well known latch device 13. In order to simplify the drawings, the latching arrangement and the handles 15 for controlling the door latch are illustrated only fragmentarily. These parts are conventional and are well understood in the art.

The automobile body has a roof panel 18 which has at opposite sides openings 20 and 20' adjacent the respective side door openings. Roof closures 22, 22', respectively, are hingedly mounted on the body for swinging movement between the closed position illustrated in Fig. 1 and the open position illustrated in Fig. 2. The hinges for the roof closures are shown at 24.

Roof closures of this type are known in the art and any suitable power operating means for the roof closures may be utilized. A particular power operating mechanism is shown and described in detail in the copending application of John Himka et al., entitled "Movable Closure Member," filed January 18, 1956, as Serial No. 559,872. The roof closure 22 is moved by power operated control means including a Teleflex cable 30, one end of which is connected to the door actuating mechanism in the roof. This door actuating mechanism is shown fragmentarily at 32' in Figs. 1 and 2. The cable 30 extends rearwardly beneath the roof panel 18 to a location behind the automobile seats, being connected at its rear end to a bell crank 34 pivoted at 36 on a stationary bracket 38. The other arm of the bell crank is connected to a screw jack operator 40 which is driven by a reversible electric motor 42.

Figure 3:
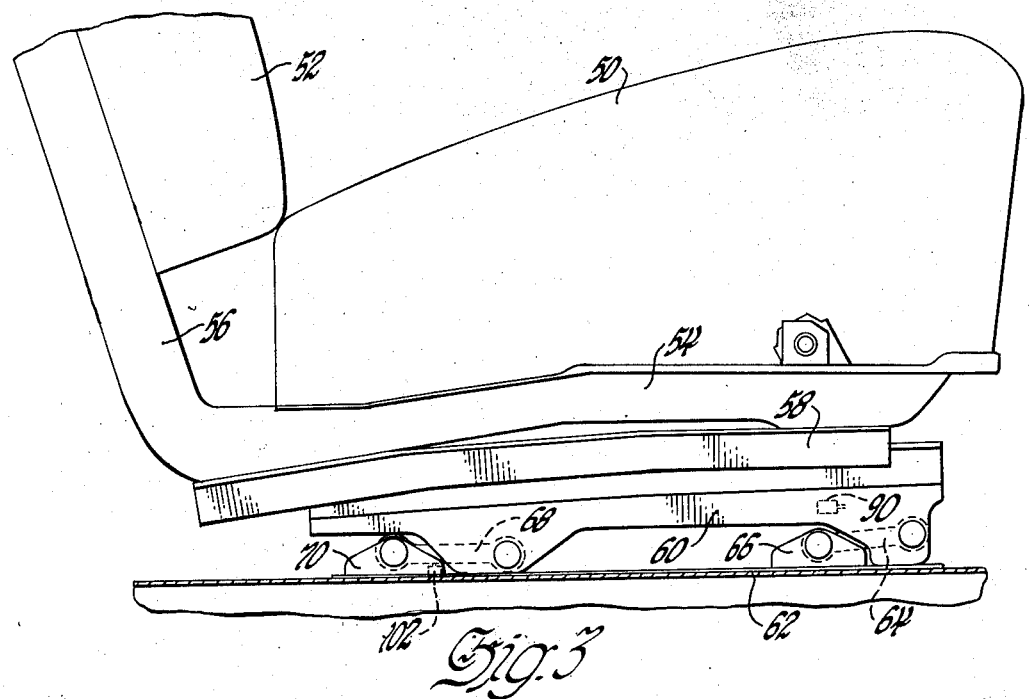
Fig. 3 is an enlarged fragmentary side elevation of the vehicle seat in lowered position.
Figure 4:
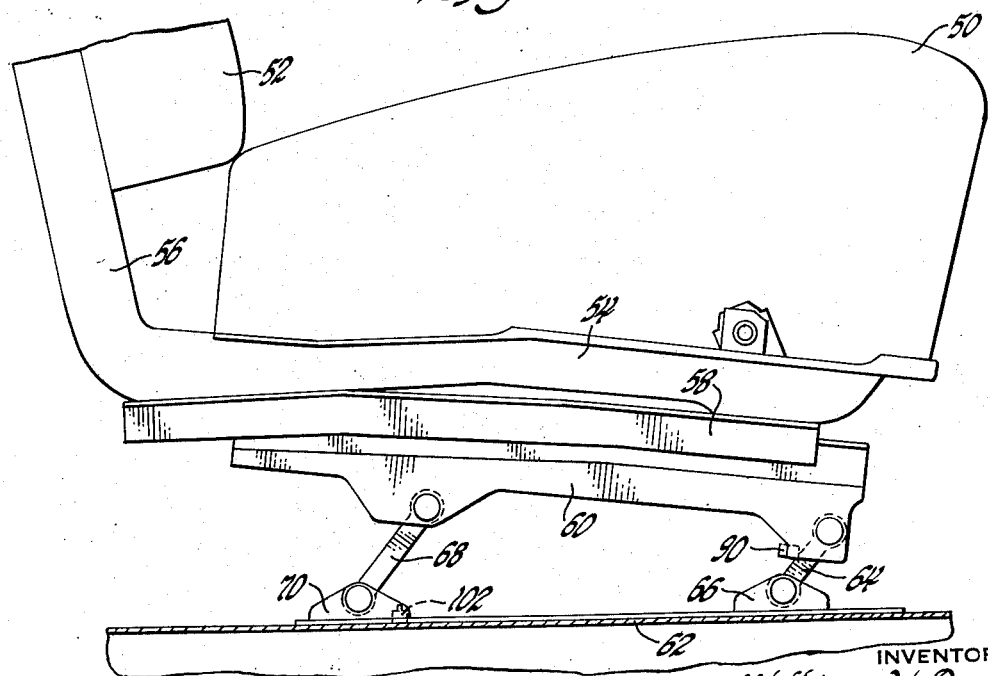
Fig. 4 is a side elevation of the seat in raised position.

The seat is shown in Figs. 1, 3 and 4 and comprises a seat cushion 50 and a seat back 52. The cushion is supported on a frame 54 from which extends a vertical back frame 56 supporting the seat back 52. The frame 54 is mounted on a horizontal seat adjusting mechanism 58 which is not shown in detail since it may be of any conventional and well known construction and since it forms no part of the present invention. Beneath the horizontal adjusting mechanism 58 is a base frame 60 which is suspended by links from the automobile floor 62 to permit vertical adjustment of the seat. At the front side of the seat a link 64 is pivotally connected between the base frame 60 and a floor support bracket 66 and at the rear side of the seat a link 68 is pivotally connected between the base frame 60 and a floor support bracket 70. The seat may be moved between a lowered position shown in Fig. 3 and a raised position shown in Fig. 4 by means of a motor 72 (Fig. 5) and any suitable mechanical crank means may be connected between the motor and the base frame 60 to raise and lower the seat, as is well understood in the art. The copending application of Louis P. Garvey et al., entitled "Seat Adjuster," and filed December 2, 1953, as Serial No. 395,822 shows in detail the operating mechanism for a similar vertically adjustable seat.

The novel control means shown in Fig. 5 provides a circuit controlling the motors 72 and 42 in response to opening and closing movements of the door so that when the automobile door 14 is opened, the seat is raised, and simultaneously the roof closure 22 is opened. When the automobile door is closed after the passenger enters the automobile, the seat is lowered, and subsequently, in response to the lowering of the seat, the roof door is closed. Referring particularly to Fig. 5, a source of voltage 80 may comprise a conventional automobile storage battery. A door jamb switch 82 (see also Figs. 1 and 2) is connected to one terminal of the battery. This switch comprises a double pole, double throw switch having an armature 83 adapted to engage either of contacts 84 or 85 and a second armature 86 adapted to engage a contact 87. When the door is closed, which is the condition of the circuit illustrated in Fig. 5, the armature 83 engages the contact 85 and the armature 86 is open, not being connected in the circuit. When the door is opened, the armatures 83 and 86 move to the position other than that illustrated so that armature 83 engages contact 84 and armature 86 engages contact 87. Opening the door thus completes a circuit through a normally closed "seat up" limit switch 90 (see also Figs. 3 and 4) to the coil 92 of a relay having a normally open armature switch 94. The other side of the relay coil is grounded. When the relay is energized due to movement of the door jamb switch armature 83 into engagement with the contact 84, relay armature 94 is drawn into engagement with its stationary contact, thus completing a circuit to the "up" winding of the reversible seat motor 72. The other side of the motor is grounded as illustrated. So long as the relay armature 94 remains closed, the seat motor will run. When the seat reaches its upper limit position, link 64 opens switch 90 (see Fig. 4) de-energizing the relay and breaking the circuit to the "up" side of the seat motor 72.

Simultaneously with the raising of the seat, a circuit is closed through door jamb switch armature 86 and its contact 87 to the coil 96 of a relay which controls the "up" side of the roof closure drive motor 42. The circuit to the relay coil includes a normally closed "roof up" limit switch 98 (see also Fig. 2). Energization of relay coil 96 pulls its armature 100 into closed position, thereby completing a circuit through the "up" side of the reversible roof closure drive motor 42. The other side of this motor is grounded. When the roof door reaches its open position, its opens limit switch 98, breaking the circuit to the relay coil 96 and causing de-energization of the roof closure drive motor 42.

When the passenger has entered the car and closes the door, the door jamb switch is operated to move the armature 83 back into engagement with the switch contact 85 and to open the circuit in which the second armature 86 is connected, thereby preventing further energization of relay coils 92 and 96. A "seat down" limit switch designated generally as 102 (see also Figs. 3 and 4) has an armature 104 adapted to engage either of contacts 106 or 108. When the seat is in its "down" position, the armature 104 engages the contact 108, but once the seat starts upward and the link 68 moves away from the switch actuator, armature 104 is spring biased to move into engagement with the contact 106. Consequently, when the door is closed with the seat up so that door jamb switch armature 83 moves into engagement with the contact 85, the "seat down" limit switch armature 104 is in a position other than that illustrated and engages contact 106 so that a circuit is completed to the coil 110 of a relay which controls the "down" side of the reversible seat motor 72. The armature 112 of this relay closes when the relay coil is energized, completing a circuit to energize the seat motor 72 in the down direction.

The "down" side of the reversible roof closure drive motor 42 is connected to the source of voltage 80 through the normally open contact 114 of a relay having a coil 116 connected through a "roof down" limit switch 118 (see also Fig. 2) to the contact 108 of the "seat down" limit switch. In the schematic diagram, the switch 118 is shown open, but when the roof closure 22 moved toward its open position when the door was first opened, it released switch 118 and the switch armature moved under an internal spring bias to its closed position. However, no circuit was at that time completed through the relay coil 116 because the "seat down" switch armature 104 was then out of engagement with contact 108. Consequently, the roof closure drive motor 42 will not be energized in a down direction until the seat has lowered and link 68 moves the armature 104 out of engagement with contact 106 to break the circuit to the seat motor 72 and into engagement with the contact 108. A circuit is now complete from the source of voltage 80 through the switch armature 83 and contact 85, the seat down switch armature 104 and contact 108 and switch 118 to the relay coil 116. Energization of this coil causes closure of the relay contact 114 and energization of the roof closure drive motor 42 in the down direction. When the roof closure 22 reaches its down or closed position, it opens limit switch 118 to break the circuit to the relay coil 116 and cut off the motor.

As described above, the circuit of the control means includes means for operating the seat motor and the roof closure drive motor in one direction simultaneously to raise the seat and open the roof closure in response to opening movement of the door. However, in immediate response to closing movement of the door, only the seat motor is driven in the opposite direction to lower the seat and subsequently to the closing of the door when the seat reaches its lower position and operates switch 102, a circuit is completed to energize the roof closure drive motor 42 in the down direction and close the roof closure member 22.

While I have shown and described one embodiment of my invention, it is capable of many modifications. Changes, therefore, in the construction and arrangement may be made without departing from the spirit and scope of the invention as set forth in the appended claims.

I claim:

1. In combination in a vehicle, a door movable between open and closed positions; a seat movable between raised and lowered positions; first motor means for moving said seat between said positions; a roof closure hingedly mounted on the vehicle adjacent said door; second motor means for moving said closure between open and closed positions; and means including a circuit connected to said first and second motor means for controlling said first and second motor means to raise said seat and open said closure in response to opening the door and to lower the seat and close the closure in predetermined sequence in response to closing movement of said door.

2. In combination in a vehicle, a door movable between open and closed positions; a seat movable between raised and lowered positions; first reversible motor means for moving said seat between said positions; a roof closure; hingedly mounted on the vehicle adjacent said door second reversible motor means for moving said closure member between open and closed positions; and means including a circuit connected to said first and second motor means for controlling the operation of said first motor means to raise and lower said seat in response to opening and closing movements of said door and for controlling operation of said second motor means in one direction to open said closure in response to opening movement of said door and in the other direction to close said closure in response to movement of said seat.

3. In combination in an automobile, a door movable between open and closed positions; a seat movable between raised and lowered positions; first reversible motor means for moving the seat between said positions; a roof closure hingedly mounted on the automobile adjacent said door; second reversible motor means for moving said roof closure between open and closed positions; a source of voltage; and a circuit connected to said source of voltage and to said first and second motor means, said circuit including means for operating said first and second motor means in one direction simultaneously to move said seat to raised position and open said roof closure in response to opening movement of said door, and means for operating said first motor means in the opposite direction to move said seat to lowered position in response to closing movement of the door and subsequently to operate said second motor means in the opposite direction to close said roof closure in response to the movement of said seat.

4. In combination in an automobile, a door movable between open and closed positions; a seat; first reversible motor means for moving the seat vertically; a roof closure hingedly mounted on the automobile adjacent said door; second reversible motor means for moving said roof closure between open and closed positions; a source of voltage; and a circuit connected to said source of voltage and to said first and second motor means, said circuit including means for operating said first and second motor means in one direction simultaneously to raise said seat and open said roof closure in response to opening movement of said door, and means for operating said first motor means in the opposite direction to lower said seat in response to closing movement of the door and subsequently to operate said second motor means in the opposite direction to close said roof closure in response to the lowering of said seat.

5. In combination in an automobile, a door movable between open and closed positions; a seat; a first reversible motor for moving the seat vertically; a roof closure hingedly mounted on the automobile adjacent said door; a second reversible motor for moving said roof closure between open and closed positions; a source of voltage; and a circuit connected to said source of voltage and to said first and second motors, said circuit including means for operating said first and second motors in one direction simultaneously to raise said seat and open said roof closure in response to opening movement of said door, and means for operating said first motor in the opposite direction to lower said seat in response to closing movement of the door and subsequently to operate said second motor in the opposite direction to close said roof closure in response to the lowering of said seat.

6. In combination in an automobile, a door movable between open and closed positions; a seat; a first reversible motor for moving the seat vertically between two limit positions; a roof closure hingedly mounted on the automobile adjacent said door; a second reversible motor for moving said roof closure between open and closed positions; a source of voltage; and a circuit connected to said source of voltage and to said first and second motors, said circuit including switch means for operating said first and second motors in one direction simultaneously to raise said seat and open said roof closure in response to opening movement of said door, and switch means for operating said first motor in the opposite direction to lower said seat in response to closing movement of the door and subsequently to operate said second motor in the opposite direction to close said roof closure in response to the lowering of said seat.

References Cited in the file of this patent

UNITED STATES PATENTS

| 2,499,749 | Hilliard et al. | Mar. 7, 1950 |
| 2,587,679 | Atkinson | Mar. 4, 1952 |
| 2,641,305 | Oishei | June 9, 1953 |